(12) United States Patent
Zhang et al.

(10) Patent No.: US 12,136,969 B2
(45) Date of Patent: Nov. 5, 2024

(54) PARAMETER SWITCH CONFIGURATIONS FOR PERIODIC COMMUNICATION OCCASIONS ASSOCIATED WITH MU-MIMO OPERATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/454,924

(22) Filed: Nov. 15, 2021

(65) Prior Publication Data
US 2023/0155640 A1    May 18, 2023

(51) Int. Cl.
*H04B 7/0452* (2017.01)
*H04B 7/06* (2006.01)
*H04W 72/1263* (2023.01)
*H04W 72/23* (2023.01)
*H04L 1/00* (2006.01)

(52) U.S. Cl.
CPC ......... *H04B 7/0452* (2013.01); *H04B 7/0695* (2013.01); *H04W 72/1263* (2013.01); *H04W 72/23* (2023.01); *H04L 1/0003* (2013.01)

(58) Field of Classification Search
CPC .............. H04B 7/0452; H04B 7/0695; H04W 72/1263; H04W 72/23; H04L 1/0003
See application file for complete search history.

(56) References Cited

U.S. PATENT DOCUMENTS

2020/0336256 A1* 10/2020 Chen ................... H04B 7/0456
2023/0028423 A1* 1/2023 Xu ...................... H04B 7/06966

FOREIGN PATENT DOCUMENTS

WO    WO-2022175926 A1 *  8/2022

* cited by examiner

*Primary Examiner* — Shailendra Kumar
(74) *Attorney, Agent, or Firm* — Harrity & Harrity, LLP

(57) ABSTRACT

Various aspects of the present disclosure generally relate to wireless communication. In some aspects, a user equipment (UE) may receive a parameter switch configuration comprising: a first parameter configuration that indicates a first value of a configuration parameter, the first value corresponding to a first set of communication occasions associated with a single user multiple input multiple output (MIMO) operation; and a second parameter configuration that indicates a second value of the configuration parameter, the second value corresponding to a second set of communication occasions associated with a multiple user MIMO operation. The UE may communicate, based at least in part on the parameter switch configuration, with at least one wireless communication device. Numerous other aspects are described.

30 Claims, 8 Drawing Sheets

500 ⟶

510 ⟶ Receive a parameter switch configuration comprising a first parameter configuration that indicates a first value of a configuration parameter, the first value corresponding to a first set of communication occasions associated with a single user multiple input multiple output (SU-MIMO) operation; and a second parameter configuration that indicates a second value of the configuration parameter, the second value corresponding to a second set of communication occasions associated with a multiple user MIMO operation (MU-MIMO)

520 ⟶ Communicate, based at least in part on the parameter switch configuration, with at least one wireless communication device

PARAMETER SWITCH CONFIGURATIONS FOR PERIODIC COMMUNICATION OCCASIONS ASSOCIATED WITH MU-MIMO OPERATION

FIELD OF THE DISCLOSURE

Aspects of the present disclosure generally relate to wireless communication and to techniques and apparatuses for parameter switch configurations for periodic communication occasions associated with multiuser-multiple input multiple output operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive a parameter switch configuration comprising a first parameter configuration that indicates a first value of a configuration parameter, the first value corresponding to a first set of communication occasions associated with a single user (SU) multiple input multiple output (MIMO) (SU-MIMO) operation; and a second parameter configuration that indicates a second value of the configuration parameter, the second value corresponding to a second set of communication occasions associated with a multiple user (MU) MIMO (MU-MIMO) operation. The one or more processors may be configured to communicate, based at least in part on the parameter switch configuration, with at least one wireless communication device.

Some aspects described herein relate to a base station for wireless communication. The base station may include a memory and one or more processors coupled to the memory. The one or more processors may be configured to transmit, to a UE, a parameter switch configuration comprising a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation. The one or more processors may be configured to communicate, based at least in part on the parameter switch configuration, with the UE.

Some aspects described herein relate to a method of wireless communication performed by a UE. The method may include receiving a parameter switch configuration comprising a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation. The method may include communicating, based at least in part on the parameter switch configuration, with at least one wireless communication device.

Some aspects described herein relate to a method of wireless communication performed by a base station. The method may include transmitting, to a UE, a parameter switch configuration comprising a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation. The method may include communicating, based at least in part on the parameter switch configuration, with the UE.

Some aspects described herein relate to a non-transitory computer-readable medium that stores a set of instructions for wireless communication by a UE. The set of instructions, when executed by one or more processors of the UE, may cause the UE to receive a parameter switch configuration comprising a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation. The set of instructions, when executed by one or more processors of the UE, may cause the UE to communicate, based at least in part on the parameter switch configuration, with at least one wireless communication device.

Some aspects described herein relate to a non-transitory computer-readable medium that stores a set of instructions for wireless communication by a base station. The set of instructions, when executed by one or more processors of the base station, may cause the base station to transmit, to a UE, a parameter switch configuration comprising a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation. The set of instructions, when executed by one or more processors of the base station, may cause the base station to communicate, based at least in part on the parameter switch configuration, with the UE.

Some aspects described herein relate to an apparatus for wireless communication. The apparatus may include means for receiving a parameter switch configuration comprising a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation. The apparatus may include means for communicating, based at least in part on the parameter switch configuration, with at least one wireless communication device.

Some aspects described herein relate to an apparatus for wireless communication. The apparatus may include means for transmitting, to a UE, a parameter switch configuration comprising a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation. The apparatus may include means for communicating, based at least in part on the parameter switch configuration, with the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
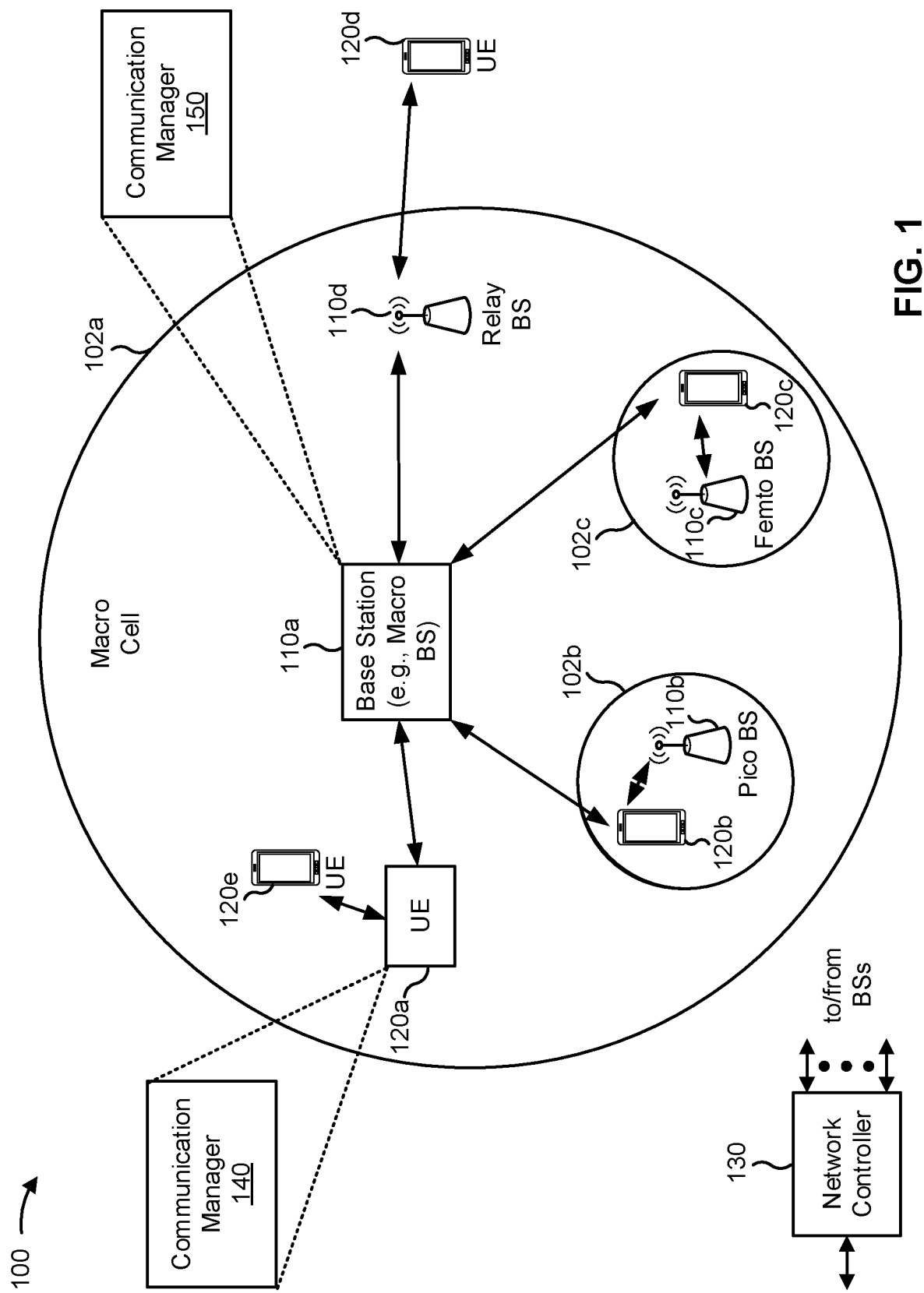
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a parameter switch configuration comprising: a first parameter configuration that indicates a first value of a configuration parameter, the first value corresponding to a first set of communication occasions associated with a single user (SU) multiple input multiple output (MIMO) (SU-MIMO) operation; and a second parameter configuration that indicates a second value of the configuration parameter, the second value corresponding to a second set of communication occasions associated with a multiple user MIMO (MU-MIMO) operation; and communicate, based at least in part on the parameter switch configuration, with at least one wireless communication device. Additionally, or alternatively, the communication manager 140 may perform one or more other operations described herein.

In some aspects, the base station 110 may include a communication manager 150. As described in more detail elsewhere herein, the communication manager 150 may transmit, to a UE, a parameter switch configuration comprising: a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation; and communicate, based at least in part on the parameter switch configuration, with the UE. Additionally, or alternatively, the communication manager 150 may perform one or more other operations described herein.

As indicated above, FIG. 1 is provided as an example. Other examples may differ from what is described with regard to FIG. 1.

Figure 2:
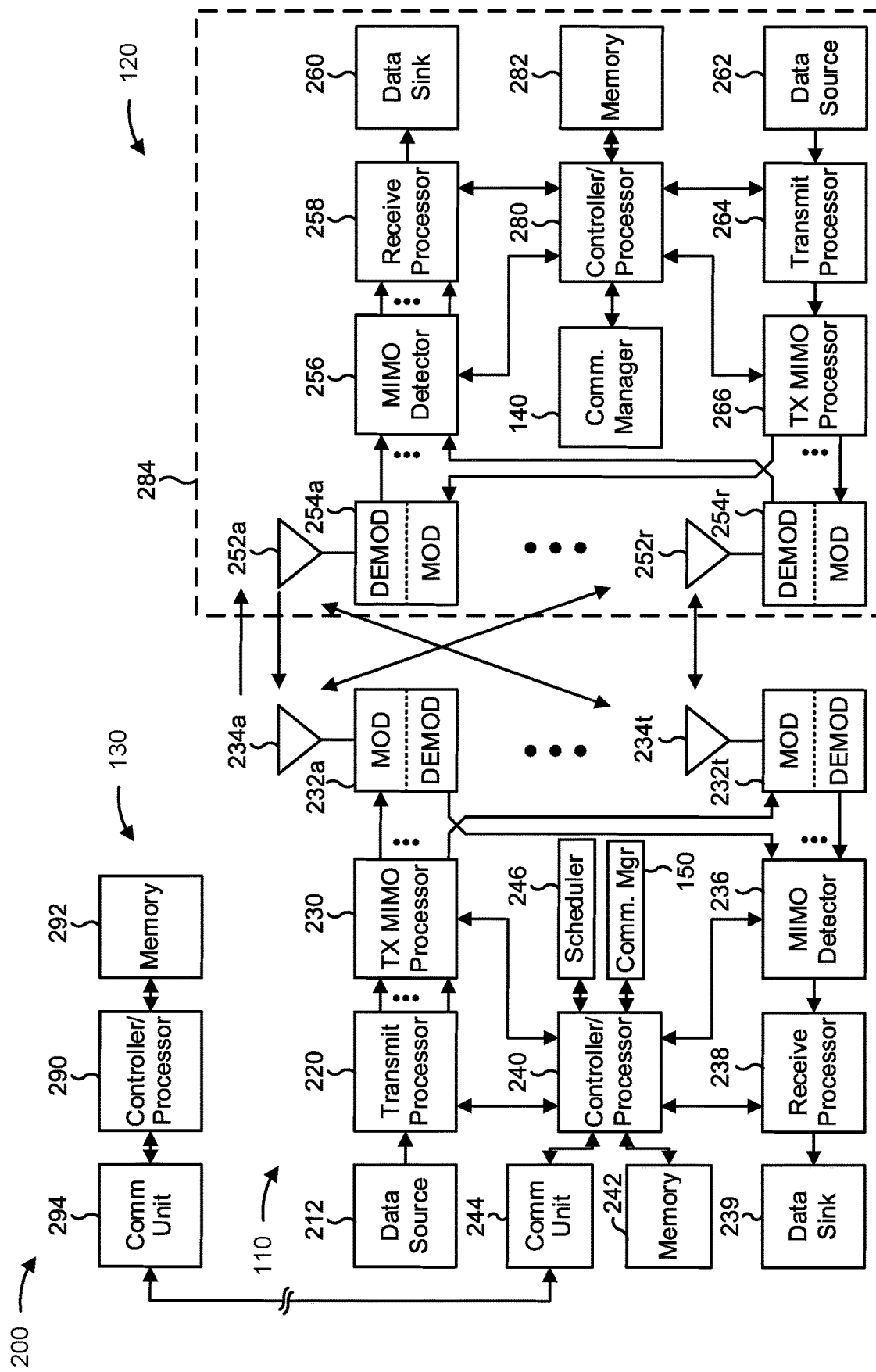
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) MIMO processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array)

can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

Some UEs and/or base stations may support full duplex operation in which the UEs and/or the base stations support full duplex operations. For example, a UE may support transmission via a first beam (e.g., using a first antenna panel) and may simultaneously support reception via a second beam (e.g., using a second antenna panel). Support for simultaneous transmission and reception may be conditional on beam separation, such as spatial separation (e.g., using different beams), frequency separation, and/or the like. Additionally, or alternatively, support for simultaneous transmission may be conditional on using beamforming (e.g., in frequency range 2 (FR2), in frequency range 4 (FR4), for millimeter wave signals, and/or the like).

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with parameter switch configurations for periodic communication occasions associated with MU-MIMO operation, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving a parameter switch configuration comprising: a first parameter configuration that indicates a first value of a configuration parameter, the first value corresponding to a first set of communication occasions associated with an SU-MIMO operation; and/or a second parameter configuration that indicates a second value of the configuration parameter, the second value corresponding to a second set of communication occasions associated with an MU-MIMO operation; and/or means for communicating, based at least in part on the parameter switch configuration, with at least one wireless communication device. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, a parameter switch configuration comprising: a first parameter configuration that indicates a first value of a configuration parameter, the first value corresponding to a first set of communication occasions associated with an SU-MIMO operation; and/or a second parameter configuration that indicates a second value of the configuration parameter, the second value corresponding to a second set of communication occasions associated with an MU-MIMO operation; and/or means for communicating, based at least in part on the parameter switch configuration, with the UE. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
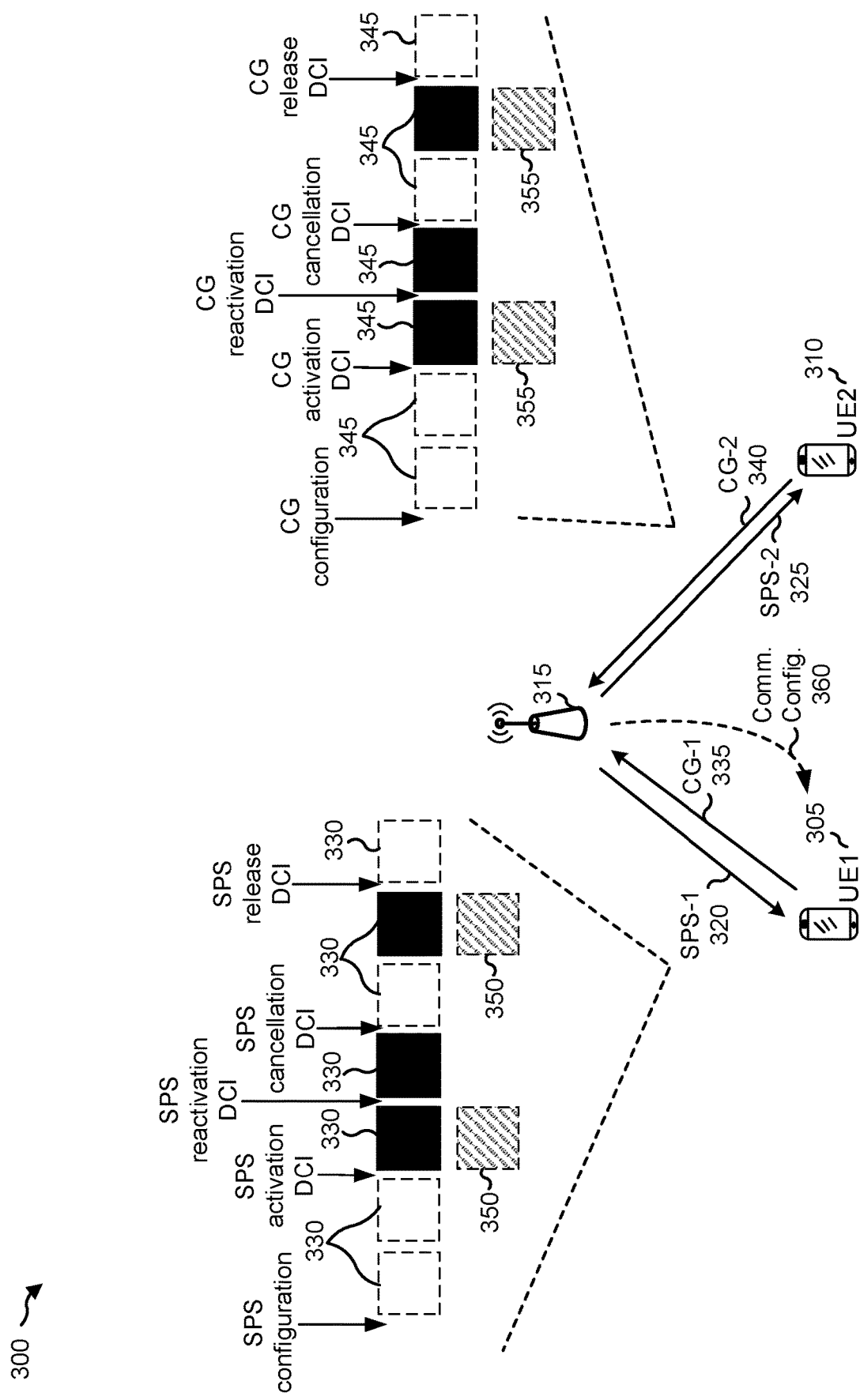
FIG. 3 is a diagram illustrating an example of single user multiple input multiple output (SU-MIMO) and multiuser-MIMO (MU-MIMO) operations associated with downlink semi-persistent scheduling communication and uplink configured grant communication, in accordance with the present disclosure.

FIG. 3 is a diagram illustrating an example 300 of SU-MIMO and MU-MIMO operations associated with downlink semi-persistent scheduling (SPS) communication and uplink configured grant (CG) communication, in accordance with the present disclosure. The example 300 of FIG. 3 includes two UEs, UE1 305 and UE2 310, that communicate with a base station 315. The UE1 305 and/or the UE2 310 may be, or be similar to, the UE 120 depicted in FIGS. 1 and 2. The base station 315 may be, or be similar to, the base station 110 depicted in FIGS. 1 and 2.

SPS communications may include periodic downlink communications that are configured for a UE, such that the base station does not need to send separate downlink control information (DCI) transmissions (shown as "DCI") to schedule each downlink communication, thereby conserving signaling overhead. CG communications may include periodic uplink communications that are configured for a UE, such that the base station does not need to send separate DCI transmission to schedule each uplink communication, thereby conserving signaling overhead.

As shown in example 300, the UE1 305 may be configured with an SPS configuration for SPS communications (shown as SPS-1 320). The UE2 310 also may be configured with an SPS configuration for SPS communications (shown as SPS-2 325). The UE1 305 and/or UE2 310 may receive the SPS configuration via a radio resource control (RRC) message transmitted by the base station 315. For example, as shown in connection with the SPS-1 320, the SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 330 for the UE1. The SPS configuration may also configure hybrid automatic repeat request (HARQ)-acknowledgement (ACK) (HARQ-ACK) feedback resources for the UE1 305 to transmit HARQ-ACK feedback for SPS physical downlink shared channel (PDSCH) communications received in the SPS occasions 330. For example, the SPS configuration may indicate a PDSCH-to-HARQ feedback timing value, which may be referred to as a K1 value in a wireless communication standard (e.g., a 3GPP standard).

The base station 315 may transmit an SPS activation DCI transmission to the UE1 305 to activate the SPS configuration for the UE1 305. The base station 315 may indicate, in the SPS activation DCI transmission, communication parameters, such as an MCS, a resource block (RB) allocation, and/or antenna ports, for the SPS PDSCH communications to be transmitted in the scheduled SPS occasions 330. The UE1 305 may begin monitoring the SPS occasions 330 based at least in part on receiving the SPS activation DCI transmission. For example, beginning with a next scheduled SPS occasion 330 subsequent to receiving the SPS activation DCI transmission, the UE1 305 may monitor the scheduled SPS occasions 330 to decode PDSCH communications using the communication parameters indicated in the SPS activation DCI transmission. The UE1 305 may refrain from monitoring configured SPS occasions 330 prior to receiving the SPS activation DCI transmission.

The base station 315 may transmit an SPS reactivation DCI transmission to the UE1 305 to change the communication parameters for the SPS PDSCH communications. For example, as shown in FIG. 3, the SPS PDSCH communications may be received in SPS occasions 330 indicated by black boxes. Based at least in part on receiving the SPS reactivation DCI transmission, the UE1 305 may begin monitoring the scheduled SPS occasions 330 using the communication parameters indicated in the SPS reactivation DCI transmission. For example, beginning with a next scheduled SPS occasion 330 subsequent to receiving the SPS reactivation DCI transmission, the UE1 305 may monitor the scheduled SPS occasions 330 to decode PDSCH communications based on the communication parameters indicated in the SPS reactivation DCI transmission.

In some cases, such as when the base station 315 does not have downlink traffic to transmit to the UE1 305, the base station 315 may transmit an SPS cancellation DCI transmission to the UE1 305 to temporarily cancel or deactivate one or more subsequent SPS occasions 330 for the UE1 305. The SPS cancellation DCI transmission may deactivate only a subsequent single SPS occasion 330 or a subsequent N SPS occasions 330 (where N is an integer). SPS occasions 330 after the one or more (e.g., N) SPS occasions 330 subsequent to the SPS cancellation DCI transmission may remain activated. Based at least in part on receiving the SPS cancellation DCI transmission, the UE1 305 may refrain from monitoring the one or more (e.g., N) SPS occasions 330 subsequent to receiving the SPS cancellation DCI transmission. As shown in example 300, the SPS cancellation DCI transmission cancels one subsequent SPS occasion 330 for the UE. After the SPS occasion 330 (or N SPS occasions) subsequent to receiving the SPS cancellation DCI transmission, the UE1 305 may automatically resume monitoring the scheduled SPS occasions 330.

The base station 315 may transmit SPS release DCI transmission to the UE1 305 to deactivate the SPS configuration for the UE1 305. The UE1 305 may stop monitoring the scheduled SPS occasions 330 based at least in part on receiving the SPS release DCI transmission. For example, the UE1 305 may refrain from monitoring any scheduled SPS occasions 330 until another SPS activation DCI transmission is received from the base station 315. Whereas the SPS cancellation DCI transmission may deactivate only a subsequent single SPS occasion 330 or a subsequent N SPS occasions 330, the SPS release DCI transmission deactivates all subsequent SPS occasions 330 for a given SPS configuration for the UE1 305 until the given SPS configuration is activated again by a new SPS activation DCI transmission.

As is further shown in example 300, the UE1 305 may be configured with a CG configuration for CG communications (shown as CG-1 335). The UE2 310 also may be configured with a CG configuration for CG communications (shown as CG-2 340). The UE1 305 and/or UE2 310 may receive the CG configuration via an RRC message transmitted by the base station 315. For example, as shown in connection with the CG-2 340, the CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 345 for the UE2 310. In some examples, the CG configuration may identify a resource pool or multiple resource pools that are available to the UE2 310 for an uplink transmission. The CG configuration may configure contention-free CG communications (e.g., where resources are dedicated for the UE to transmit uplink communications) or contention-based CG communications (e.g., where the UE2 310 contends for access to a channel in the configured resource allocation, such as by using a channel access procedure or a channel sensing procedure).

The base station 315 may transmit a CG activation DCI transmission to the UE2 310 to activate the CG configuration for the UE2 310. The base station 315 may indicate, in the CG activation DCI transmission, communication parameters, such as an MCS, an RB allocation, and/or antenna ports, for the CG physical uplink shared channel (PUSCH) communications to be transmitted in the scheduled CG occasions 345. The UE2 310 may begin transmitting in the CG occasions 345 based at least in part on receiving the CG activation DCI transmission. For example, as shown in FIG. 3, the CG PUSCH communications may be transmitted in CG occasions 345 indicated by black boxes. For example, beginning with a next scheduled CG occasion 345 subsequent to receiving the CG activation DCI transmission, the UE2 310 may transmit a PUSCH communication in the scheduled CG occasions 345 using the communication parameters indicated in the CG activation DCI transmission.

The UE2 310 may refrain from transmitting in configured CG occasions 345 prior to receiving the CG activation DCI transmission.

The base station 315 may transmit a CG reactivation DCI transmission to the UE2 310 to change the communication parameters for the CG PUSCH communications. Based at least in part on receiving the CG reactivation DCI transmission, the UE2 310 may begin transmitting in the scheduled CG occasions 345 using the communication parameters indicated in the CG reactivation DCI transmission. For example, beginning with a next scheduled CG occasion 345 subsequent to receiving the CG reactivation DCI transmission, the UE2 310 may transmit PUSCH communications in the scheduled CG occasions 345 based at least in part on the communication parameters indicated in the CG reactivation DCI transmission.

In some cases, such as when the base station 315 needs to override a scheduled CG communication for a higher priority communication, the base station 315 may transmit a CG cancellation DCI transmission to the UE2 310 to temporarily cancel or deactivate one or more subsequent CG occasions 345 for the UE2 310. The CG cancellation DCI transmission may deactivate only a subsequent single CG occasion 345 or a subsequent N CG occasions 345 (where N is an integer). CG occasions 345 after the one or more (e.g., N) CG occasions 345 subsequent to the CG cancellation DCI transmission may remain activated. Based at least in part on receiving the CG cancellation DCI transmission, the UE2 310 may refrain from transmitting in the one or more (e.g., N) CG occasions 345 subsequent to receiving the CG cancellation DCI transmission. As shown in example 300, the CG cancellation DCI transmission cancels one subsequent CG occasion 345 for the UE2 310. After the CG occasion 345 (or N CG occasions) subsequent to receiving the CG cancellation DCI transmission, the UE2 310 may automatically resume transmission in the scheduled CG occasions 345.

The base station 315 may transmit a CG release DCI transmission to the UE2 310 to deactivate the CG configuration for the UE2 310. The UE2 310 may stop transmitting in the scheduled CG occasions 345 based at least in part on receiving the CG release DCI transmission. For example, the UE2 310 may refrain from transmitting in any scheduled CG occasions 345 until another CG activation DCI transmission is received from the base station 315. Whereas the CG cancellation DCI transmission may deactivate only a subsequent single CG occasion 345 or a subsequent N CG occasions 345, the CG release DCI transmission deactivates all subsequent CG occasions 345 for a given CG configuration for the UE2 310 until the given CG configuration is activated again by a new CG activation DCI transmission.

As shown, the UE1 305, UE2 310, and base station 315 may engage in the SPS communications and/or CG communications described above using SU-MIMO operations or MU-MIMO operations. In some cases, communicating in connection with an SU-MIMO operation or an MU-MIMO operation may be referred to as communicating in an SU-MIMO mode or an MU-MIMO mode, respectively. For example, the UE1 305 may receive SPS communications in an SU-MIMO mode during the second active SPS occasion 330 (the second SPS occasion 330 from the left illustrated as a black box) because the base station 315 transmits only to the UE1 305 during that SPS occasion 330. The UE1 305 may receive SPS communications in an MU-MIMO mode during the first active SPS occasion 330 (the first SPS occasion 330 from the left illustrated as a black box) and the third SPS occasion 330 because the base station 315 transmits to the UE1 305 and another UE (e.g., the UE2 310) during those SPS occasions 330. For example, as shown, the first active SPS occasion 330 and the third active SPS occasion 330 each may at least partially overlap a first active SPS occasion 350 corresponding to another UE (e.g., the UE2 310) and a second active SPS occasion 350 corresponding to another UE (e.g., the UE2 310) in a time domain. In some cases, the SPS occasions 350 may correspond to the SPS-2 communication 325.

Similarly, the UE2 310 may transmit CG communications in an SU-MIMO mode during the second active CG occasion 345 (the second CG occasion 345 from the left illustrated as a black box) because the base station 315 receives only from the UE2 310 during that CG occasion 345. The UE2 310 may transmit CG communications in an MU-MIMO mode during the first active CG occasion 345 (the first CG occasion 345 from the left illustrated as a black box) and the third CG occasion 345 because the base station 315 receives from the UE2 310 and another UE (e.g., the UE1 305) during those CG occasions 345. For example, as shown, the first active CG occasion 345 and the third active CG occasion 345 each may at least partially overlap a first active CG occasion 355 corresponding to another UE (e.g., the UE1 305) and a second active CG occasion 355 corresponding to another UE (e.g., the UE1 305) in a time domain. In some cases, the CG occasions 355 may correspond to the CG-1 communication 335.

Beam separation of the beams associated with MU-MIMO assists in limiting or reducing self-interference that may occur during MU-MIMO communication. It is desirable to select beams that are on different antenna panels to minimize self-interference. Determining the beams that are separated on their respective antenna panels may provide a reliable MU-MIMO communication by facilitating selection of beam pairs that minimize or reduce self-interference.

In some cases, a UE may perform a self-interference measurement (SIM) procedure in order to identify self-interference from transmissions of the UE. A base station also may perform a SIM procedure in order to identify self-interference from transmissions of the base station. The UE may provide a measurement report to the base station to indicate results of the UE SIM. The base station may select pairs of beams (referred to herein as "beam pairs") for the UE ("UE beam pairs") and the base station ("base station beam pairs") to use during MU-MIMO communications. A beam pair may include a first uplink beam and a second uplink beam or a first downlink beam and a second downlink beam. In some aspects, a beam pair may include a pair of receive (Rx) beams and/or a pair of transmit (Tx) beams.

The beam pairs may be used to transmit and receive communications. However, to facilitate the communications, resources must be scheduled. In some cases, scheduling SPS communications and/or CG communications in connection with two or more UEs may lead to overlapping communication occasions in which configuration parameters interact to cause interference, thereby having a negative impact on network performance.

Some techniques and apparatuses described herein provide for SU-MIMO and MU-MIMO scheduling. Resources may be scheduled for selected beam pairs. In some aspects, a base station may transmit, to a UE, at least one configuration communication (e.g., an RRC message and/or a DCI transmission) for scheduling SPS communications and/or CG communications. The configuration communication may include a parameter switch configuration. The parameter switch configuration may include a first parameter configuration that indicates a first value of a configuration parameter, the first value corresponding to a first set of communication occasions associated with an SU-MIMO operation, and a second parameter configuration that indicates a second value of the configuration parameter, the second value corresponding to a second set of communication occasions associated with an MU-MIMO operation. The UE and the base station may communicate based at least in part on the parameter switch configuration.

For example, as shown by reference number 360, the base station 315 may transmit, and the UE1 305 may receive, a configuration communication (shown as "Comm. Config.") that includes a parameter switch configuration. The parameter switch configuration may indicate a first value of a configuration parameter corresponding to the second active SPS occasion 330 and a second value of the configuration parameter corresponding to the first and third SPS occasions 330. The first value of the configuration parameter (or set of first values of a set of configuration parameters) may be associated with SU-MIMO operation, and the second value of the configuration parameter (or set of second values of the set of configuration parameters) may be associated with MU-MIMO operation. In some aspects, the UE2 310 may receive a configuration communication that includes a parameter switch configuration that may be different than the parameter switch configuration provided to the UE1 305. In this way, some aspects may facilitate scheduling across two or more beams for periodic communication occasions. Some aspects may facilitate configuration parameter switching that may enable using parameters that are appropriate for certain communication occasions and switching parameters for other communication occasions to parameter values that are more appropriate for those communication occasions. In this way, some aspects of the techniques and apparatuses described herein may facilitate scheduling SU-MIMO and MU-MIMO resources, thereby having a positive impact on network performance.

As indicated above, FIG. 3 is provided as an example. Other examples may differ from what is described with respect to FIG. 3.

Figure 4:
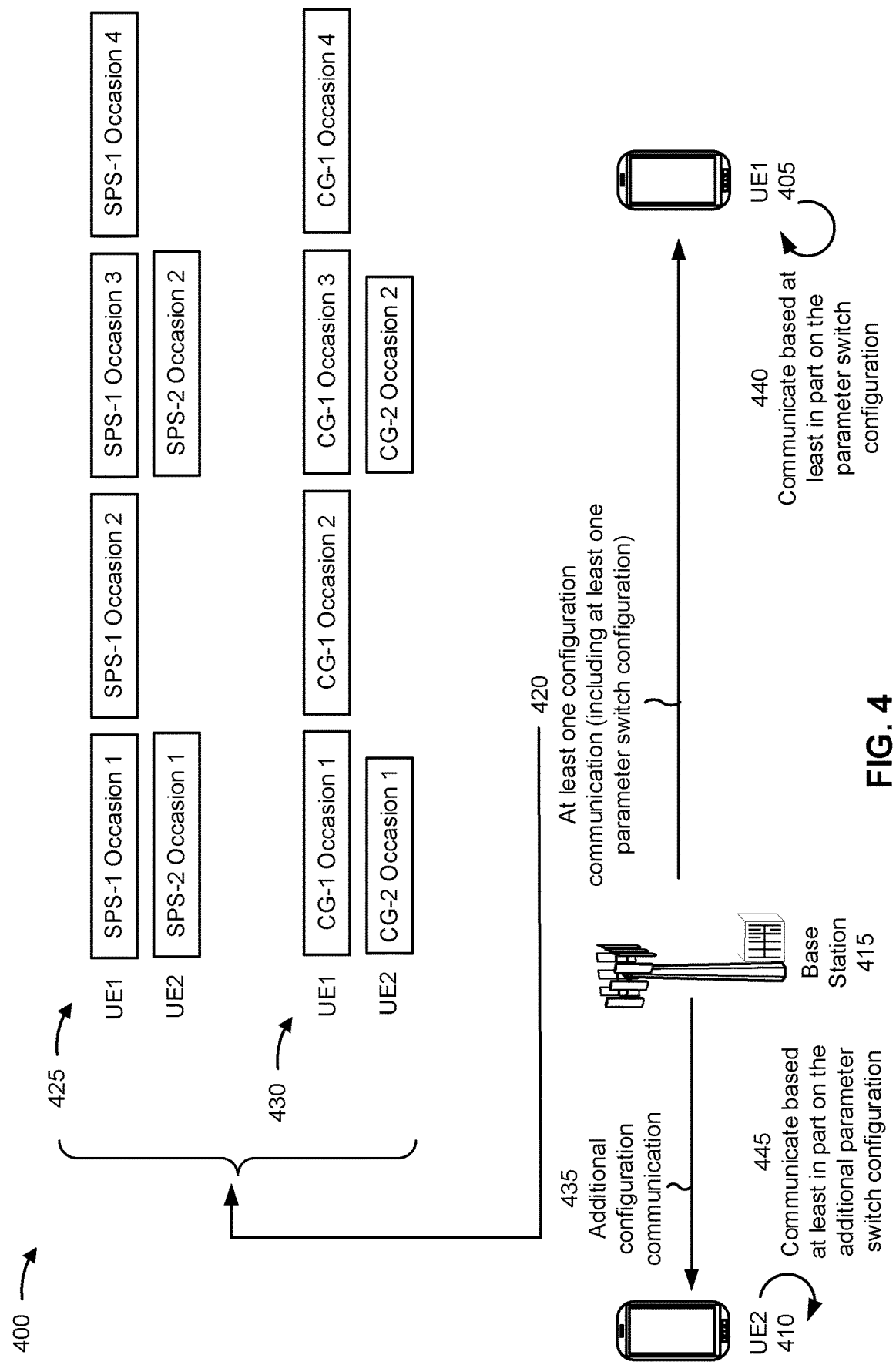
FIG. 4 is a diagram illustrating an example associated with parameter switch configurations for periodic communication occasions associated with MU-MIMO operation, in accordance with the present disclosure.

FIG. 4 is a diagram illustrating an example 400 associated with parameter switch configurations for periodic communication occasions associated with MU-MIMO, in accordance with the present disclosure. As shown in FIG. 4, a UE1 405, a UE2 410, and a base station 415 may communicate with one another. The UE1 405 may be, or be similar to, the UE1 305 depicted in FIG. 3, the UE2 310 depicted in FIG. 3, and/or the UE 120 depicted in FIGS. 1 and 2. The UE2 410 may be, or be similar to, the UE1 305 depicted in FIG. 3, the UE2 310 depicted in FIG. 3, and/or the UE 120 depicted in FIGS. 1 and 2. The base station 415 may be, or be similar to, the base station 315 depicted in FIG. 3 and/or the base station 110 depicted in FIGS. 1 and 2. Example 400 illustrates configuration parameter switching for periodic communications. As shown in FIG. 4, the periodic communications may include SPS communications and CG communications.

As shown by reference number 420, the base station 410 may transmit, and the UE1 405 may receive, at least one configuration communication that includes a parameter switch configuration. The at least one configuration communication may include at least one of an RRC message or a DCI transmission. The parameter switch configuration may include a first parameter configuration that indicates a first value of a configuration parameter, the first value corresponding to a first set of communication occasions associated with an SU-MIMO operation, and a second parameter configuration that indicates a second value of the configuration parameter, the second value corresponding to a second set of communication occasions associated with an MU-MIMO operation. The first set of communication occasions and/or the second set of communication occasions may include a set of SPS occasions and/or a set of CG occasions.

For example, as shown by reference number 425, a configuration communication may schedule and/or activate an SPS allocation corresponding to the UE1 405 and a parameter switch pattern associated with the SPS allocation. In some aspects, the communication occasions associated with the SPS (which may be referred to as the "SPS occasions" and are shown as "SPS-1 Occasion 1," "SPS-1 Occasion 2," "SPS-1 Occasion 3," and "SPS-1 Occasion 4") may be configured by an RRC message and activated (and/or deactivated) by the respective DCI transmission. In some aspects, the resource allocation may be fully configured and released using RRC signaling for longer term requirements. In some aspects, the resource allocation may be partially configured using RRC signaling and may be subsequently activated and deactivated using physical downlink control channel (PDCCH) transmissions.

As shown by reference number 430, a configuration communication may schedule and/or activate a CG allocation corresponding to the UE1 405 and a parameter switch pattern associated with the CG allocation. In some aspects, the communication occasions associated with the CG communication (which may be referred to as the "CG-1 occasions" and are shown as "CG-1 Occasion 1," "CG-1 Occasion 2," "CG-1 Occasion 3," and "CG-1 Occasion 4") may be configured by an RRC message and activated (and/or deactivated) by the respective DCI transmission. In some aspects, the resource allocation may be fully configured and released using RRC signaling for longer term requirements. In some aspects, the resource allocation may be partially configured using RRC signaling and may be subsequently activated and deactivated using PDCCH transmissions.

In some aspects, the SPS-1 communications and/or CG-1 communications may be configured and scheduled via RRC with different configurations on different occasions. For example, as indicated above, the parameter switch configuration may include a first parameter configuration that indicates a first value of a configuration parameter, the first value corresponding to a first set of communication occasions associated with an SU-MIMO operation, and a second parameter configuration that indicates a second value of the configuration parameter, the second value corresponding to a second set of communication occasions associated with an MU-MIMO operation.

As shown by reference number 435, the base station 410 may transmit, and the UE2 410 may receive, at least one additional configuration communication that includes an additional parameter switch configuration. The at least one additional configuration communication may include at least one of an RRC message or a DCI transmission. The additional parameter switch configuration may include a third parameter configuration that indicates a third value of a configuration parameter, the third value corresponding to a third set of communication occasions associated with an SU-MIMO operation, and a fourth parameter configuration that indicates a fourth value of the configuration parameter, the fourth value corresponding to a fourth set of communication occasions associated with an MU-MIMO operation. The third set of communication occasions and/or the fourth set of communication occasions may include a set of SPS occasions and/or a set of CG occasions.

For example, as shown by reference number 425, an additional configuration communication may schedule and/ or activate an SPS allocation corresponding to the UE2 410 and a parameter switch pattern associated with the SPS allocation. In some aspects, the communication occasions associated with the SPS (which may be referred to as the "SPS-2 occasions" and are shown as "SPS-2 Occasion 1" and "SPS-2 Occasion 2") may be configured by an RRC message and activated (and/or deactivated) by the respective DCI transmission. In some aspects, the resource allocation may be fully configured and released using RRC signaling for longer term requirements. In some aspects, the resource allocation may be partially configured using RRC signaling and may be subsequently activated and deactivated using PDCCH transmissions.

As shown by reference number 430, an additional configuration communication may schedule and/or activate a CG allocation corresponding to the UE2 410 and a parameter switch pattern associated with the CG allocation. In some aspects, the communication occasions associated with the CG communication (which may be referred to as the "CG-2 occasions" and are shown as "CG-2 Occasion 1" and "CG-2 Occasion 2") may be configured by an RRC message and activated (and/or deactivated) by the respective DCI transmission. In some aspects, the resource allocation may be fully configured and released using RRC signaling for longer term requirements. In some aspects, the resource allocation may be partially configured using RRC signaling and may be subsequently activated and deactivated using PDCCH transmissions. In some aspects, the SPS-2 communications and/or CG-2 communications may be configured and scheduled via RRC with different configurations on different occasions.

As shown, for example, the SPS-1 Occasion 1 may be associated with an MU-MIMO operation (as the SPS-1 Occasion 1 occurs during a time period overlapping a time associated with the SPS-2 Occasion 1), and the SPS-1 Occasion 2 may be associated with an SU-MIMO operation (as it occurs during a time period that does not overlap a time period associated with the SPS-2). A configuration parameter value that is configured, calculated, and/or selected based at least in part on the MU-MIMO operation may be used for SPS-1 Occasion 1 and/or SPS-2 Occasion 1, while a configuration parameter value that is configured, calculated, and/or selected based at least in part on an SU-MIMO operation may be used for the SPS-1 Occasion 2. The SPS-2 and CG-2 occasions may be similarly configured but use different configuration parameters such that SPS-2 communications do not interfere with SPS-1 communications and CG-2 communications do not interfere with CG-1 communications.

In this way, for example, a UE1 405, UE2 410, and/or a base station 415 may utilize configuration parameter values for SU-MIMO operations that may be more efficient and/or effective but that may result in interference in an MU-MIMO mode, and the UE1 405, UE2 410, and/or the base station 415 may utilize configuration parameter values for the MU-MIMO operation that are less likely to result in interference. In other aspects, the time period associated with the SPS-1 Occasion 2 may overlap a time period associated with another downlink and/or uplink communication (e.g., a communication that does not cause interference associated with the SPS-1 Occasion 2).

In some aspects, the parameter switch configuration may indicate at least one parameter switching pattern associated with the first value of the configuration parameter and the second value of the configuration parameter. The first value of the configuration parameter may include a first beam configuration that indicates a beam selection based at least in part on a signal quality corresponding to the first set of communication occasions. The second value of the configuration parameter may include a beam pair configuration that indicates a first beam that is paired with a second beam corresponding to an additional UE (e.g., the UE2 410). The first beam may include a first uplink beam and the second beam may include a second uplink beam. The first beam may include a first downlink beam and the second beam may include a second downlink beam.

The first parameter configuration may be based at least in part on at least one signal quality measurement corresponding to the first set of communication occasions. The second parameter configuration may include a parameter pair configuration that indicates a first paired parameter value. The first paired parameter value may be paired with a second paired parameter value corresponding to an additional UE (e.g., the UE2 410). In some aspects, the configuration parameter may include a transmission parameter. The transmission parameter may indicate at least one of a downlink modulation and coding scheme (MCS), an uplink MCS, a downlink precoder, an uplink precoder, a downlink rank indicator, an uplink rank indicator, a downlink transmission power, or an uplink transmission power.

As shown by reference number 440, the UE1 405 may communicate, based at least in part on the parameter switching pattern, with at least one wireless communication device. In some aspects, the UE1 405 may communicate with the base station 415. In some aspects, the UE1 405 may communicate with another wireless communication device (not shown in FIG. 4).

As shown by reference number 445, the UE2 410 may communicate, based at least in part on the additional parameter switching pattern, with at least one wireless communication device. In some aspects, the UE2 410 may communicate with the base station 415. In some aspects, the UE2 410 may communicate with another wireless communication device (not shown in FIG. 4).

As indicated above, FIG. 4 is provided as an example. Other examples may differ from what is described with respect to FIG. 4.

Figure 5:
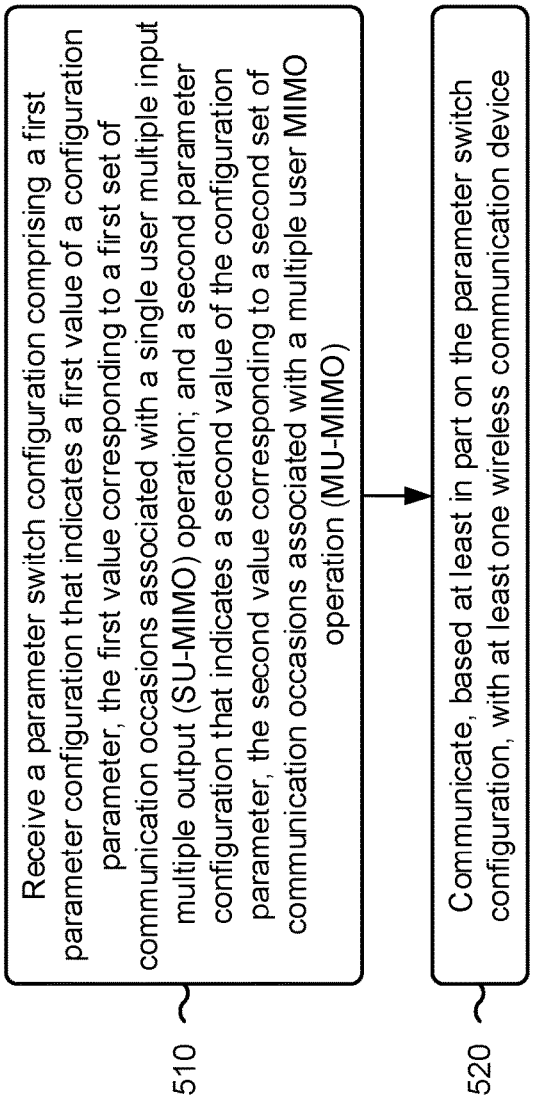
FIGS. 5 and 6 are diagrams illustrating example processes associated with parameter switch configurations for periodic communication occasions associated with MU-MIMO operation, in accordance with the present disclosure.

FIG. 5 is a diagram illustrating an example process 500 performed, for example, by a UE, in accordance with the present disclosure. Example process 500 is an example where the UE (e.g., UE 405) performs operations associated with parameter switch configurations for periodic communication occasions associated with MU-MIMO operation.

As shown in FIG. 5, in some aspects, process 500 may include receiving a parameter switch configuration comprising: a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation (block 510). For example, the UE (e.g., using communication manager 140 and/or reception component 702, depicted in FIG. 7) may receive a parameter switch configuration comprising: a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation, as described above.

As further shown in FIG. 5, in some aspects, process 500 may include communicating, based at least in part on the parameter switch configuration, with at least one wireless communication device (block 520). For example, the UE (e.g., using communication manager 140, the reception component 702, and/or the transmission component 704, depicted in FIG. 7) may communicate, based at least in part on the parameter switch configuration, with at least one wireless communication device, as described above.

Process 500 may include additional aspects, such as any single aspect or any combination of aspects described below and/or in connection with one or more other processes described elsewhere herein.

In a first aspect, the first set of communication occasions comprises at least one of a set of SPS occasions or a set of CG occasions. In a second aspect, alone or in combination with the first aspect, the parameter switch configuration indicates at least one parameter switching pattern associated with the first value of the configuration parameter and the second value of the configuration parameter.

In a third aspect, alone or in combination with one or more of the first and second aspects, the first value of the configuration parameter comprises a first beam configuration that indicates a beam selection based at least in part on a signal quality corresponding to the first set of communication occasions. In a fourth aspect, alone or in combination with one or more of the first through third aspects, the second value of the configuration parameter comprises a beam pair configuration that indicates a first beam, and the first beam is paired with a second beam corresponding to an additional UE. In a fifth aspect, alone or in combination with the fourth aspect, the first beam comprises a first uplink beam and the second beam comprises a second uplink beam. In a sixth aspect, alone or in combination with the fourth aspect, the first beam comprises a first downlink beam and the second beam comprises a second downlink beam.

In a seventh aspect, alone or in combination with one or more of the first through sixth aspects, the first parameter configuration is based at least in part on at least one signal quality measurement corresponding to the first set of communication occasions. In an eighth aspect, alone or in combination with one or more of the first through seventh aspects, the second parameter configuration comprises a parameter pair configuration that indicates a first paired parameter value, and the first paired parameter value is paired with a second paired parameter value corresponding to an additional UE.

In a ninth aspect, alone or in combination with one or more of the first through eighth aspects, the configuration parameter comprises a transmission parameter. In a tenth aspect, alone or in combination with the ninth aspect, the transmission parameter indicates at least one of a downlink MCS, an uplink MCS, a downlink precoder, an uplink precoder, a downlink rank indicator, an uplink rank indicator, a downlink transmission power, or an uplink transmission power.

In an eleventh aspect, alone or in combination with one or more of the first through tenth aspects, receiving the parameter switch configuration comprises receiving at least one configuration communication that indicates the parameter switch configuration, the at least one configuration communication comprising at least one of an RRC message or a DCI transmission.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
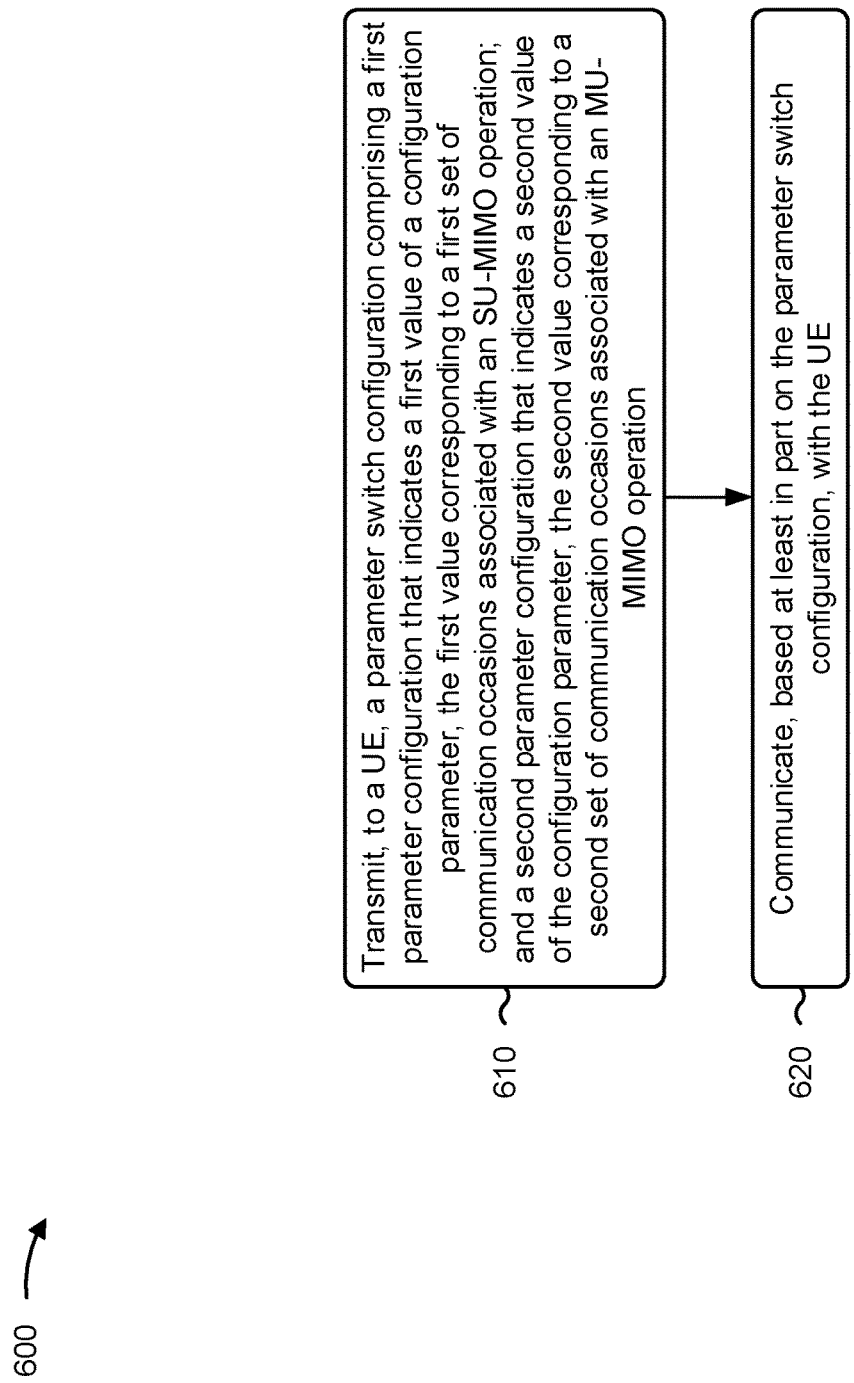

FIG. 6 is a diagram illustrating an example process 600 performed, for example, by a base station, in accordance with the present disclosure. Example process 600 is an example where the base station (e.g., base station 410) performs operations associated with parameter switch configurations for periodic communication occasions associated with MU-MIMO operation.

As shown in FIG. 6, in some aspects, process 600 may include transmitting, to a UE, a parameter switch configuration comprising: a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation (block 610). For example, the base station (e.g., using communication manager 150 and/or transmission component 804, depicted in FIG. 8) may transmit, to a UE, a parameter switch configuration comprising: a first parameter configuration that indicates a first value of a configuration parameter, the first value corresponding to a first set of communication occasions associated with an SU-MIMO operation; and a second parameter configuration that indicates a second value of the configuration parameter, the second value corresponding to a second set of communication occasions associated with an MU-MIMO operation, as described above.

As further shown in FIG. 6, in some aspects, process 600 may include communicating, based at least in part on the parameter switch configuration, with the UE (block 620). For example, the base station (e.g., using communication manager 150, reception component 802, and/or transmission component 804, depicted in FIG. 8) may communicate, based at least in part on the parameter switch configuration, with the UE, as described above.

Process 600 may include additional aspects, such as any single aspect or any combination of aspects described below and/or in connection with one or more other processes described elsewhere herein.

In a first aspect, the first set of communication occasions comprises at least one of a set of SPS occasions or a set of CG occasions. In a second aspect, alone or in combination with the first aspect, the parameter switch configuration indicates at least one parameter switching pattern associated with the first value of the configuration parameter and the second value of the configuration parameter.

In a third aspect, alone or in combination with one or more of the first and second aspects, the first value of the configuration parameter comprises a first beam configuration that indicates a beam selection based at least in part on a signal quality corresponding to the first set of communication occasions. In a fourth aspect, alone or in combination with one or more of the first through third aspects, the second value of the configuration parameter comprises a beam pair configuration that indicates a first beam, and the first beam is paired with a second beam corresponding to an additional UE. In a fifth aspect, alone or in combination with the fourth aspect, process 600 includes transmitting, to the additional UE, an additional parameter switch configuration that indicates the second beam. In a sixth aspect, alone or in combination with the fourth aspect, the first beam comprises a first uplink beam and the second beam comprises a second uplink beam. In a seventh aspect, alone or in combination with the fourth aspect, the first beam comprises a first downlink beam and the second beam comprises a second downlink beam.

In an eighth aspect, alone or in combination with one or more of the first through seventh aspects, the first parameter configuration is based at least in part on at least one signal quality measurement corresponding to the first set of communication occasions. In a ninth aspect, alone or in combination with one or more of the first through eighth aspects, the second parameter configuration comprises a parameter pair configuration that indicates a first paired parameter value, and the first paired parameter value is paired with a second paired parameter value corresponding to an additional UE. In a tenth aspect, alone or in combination with the ninth aspect, process 600 includes transmitting, to the additional UE, an additional parameter switch configuration that indicates the second paired parameter value.

In an eleventh aspect, alone or in combination with one or more of the first through tenth aspects, the configuration parameter comprises a transmission parameter. In a twelfth aspect, alone or in combination with the eleventh aspect, the transmission parameter indicates at least one of a downlink MCS, an uplink MCS, a downlink precoder, an uplink precoder, a downlink rank indicator, an uplink rank indicator, a downlink transmission power, or an uplink transmission power.

In a thirteenth aspect, alone or in combination with one or more of the first through twelfth aspects, transmitting the parameter switch configuration comprises transmitting at least one configuration communication that indicates the parameter switch configuration, the at least one configuration communication comprising at least one of an RRC message or a DCI transmission.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
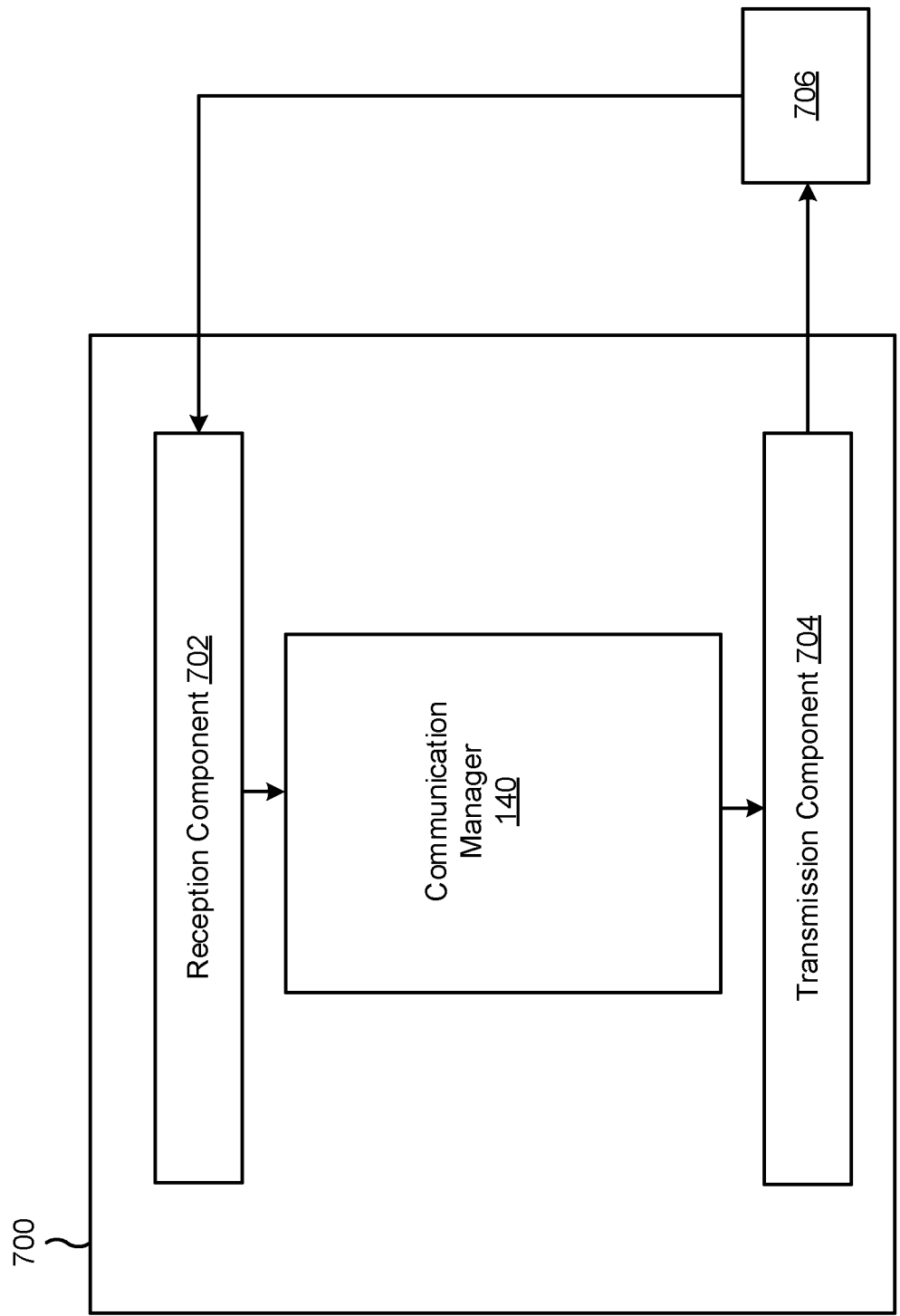
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive a parameter switch configuration comprising a first parameter configuration that indicates a first value of a configuration parameter, the first value corresponding to a first set of communication occasions associated with an SU-MIMO operation, and a second parameter configuration that indicates a second value of the configuration parameter, the second value corresponding to a second set of communication occasions associated with an MU-MIMO operation.

The communication manager 140, the reception component 702, and/or the transmission component 704 may communicate, based at least in part on the parameter switch configuration, with at least one wireless communication device. In some aspects, the communication manager 140 may include one or more antennas, a modem, a modulator, a demodulator, a MIMO detector, a receive processor, a transmit MIMO processor, a transmit processor, a controller/processor, a memory, or a combination thereof, of the UE described in connection with FIG. 2. In some aspects, the communication manager 140 may include the reception component 702 and/or the transmission component 704.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
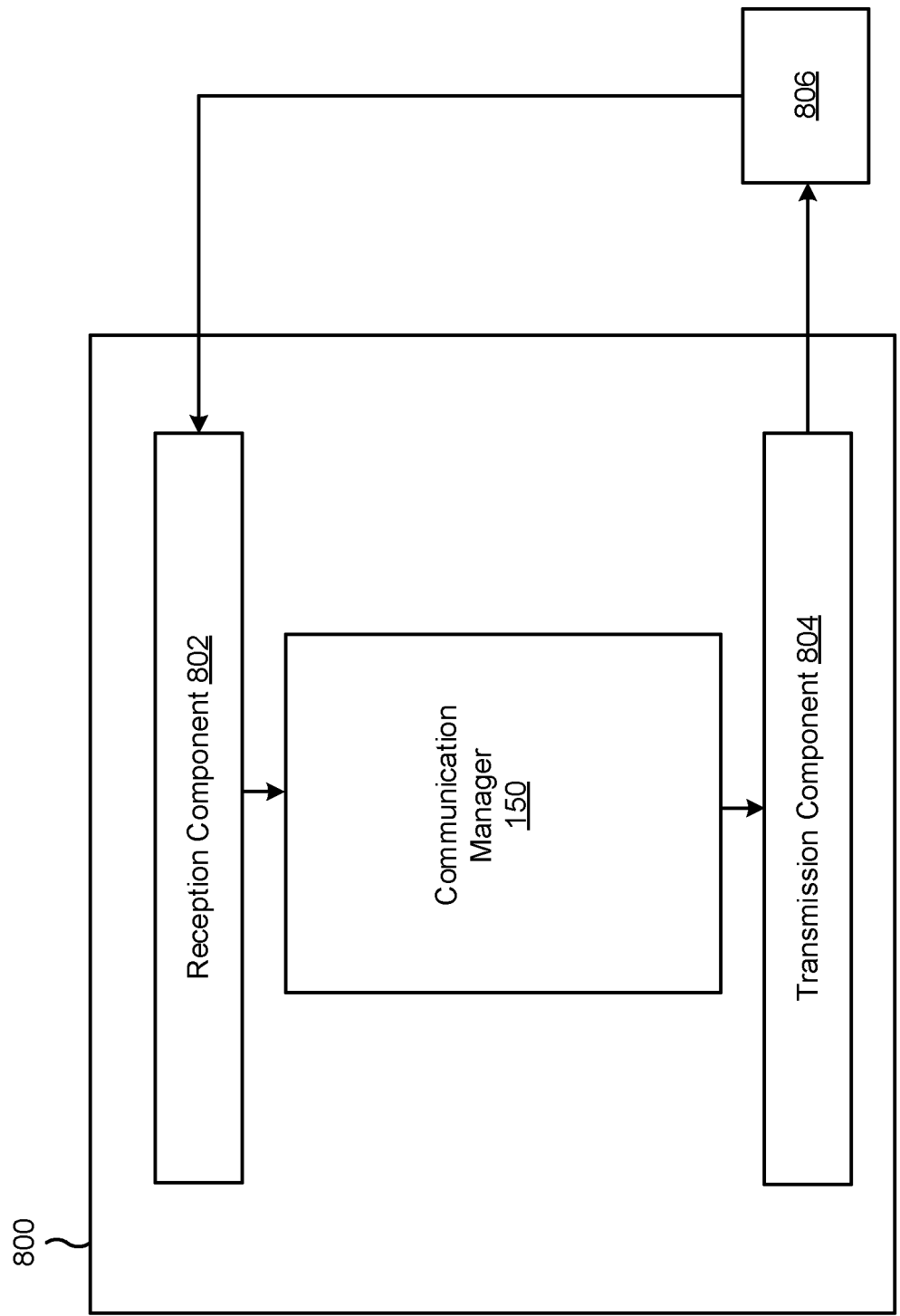

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit, to a UE, a parameter switch configuration comprising a first parameter configuration that indicates a first value of a configuration parameter, the first value corresponding to a first set of communication occasions associated with an SU-MIMO operation, and a second parameter configuration that indicates a second value of the configuration parameter, the second value corresponding to a second set of communication occasions associated with an MU-MIMO operation.

The communication manager 150, the reception component 802, and/or the transmission component 804 may communicate, based at least in part on the parameter switch configuration, with the UE. In some aspects, the communication manager 150 may include one or more antennas, a modem, a modulator, a demodulator, a MIMO detector, a receive processor, a transmit MIMO processor, a transmit processor, a controller/processor, a memory, or a combination thereof, of the base station described in connection with FIG. 2. In some aspects, the communication manager 150 may include the reception component 802 and/or the transmission component 804.

The parameter switch configuration may indicate a first beam and/or a first paired parameter value, and the transmission component 804 may transmit, to an additional UE, an additional parameter switch configuration that indicates a second beam and/or a second paired parameter value.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a parameter switch configuration comprising: a first parameter configuration that indicates a first value of a configuration parameter, the first value corresponding to a first set of communication occasions associated with a single user multiple input multiple output (MIMO) operation; and a second parameter configuration that indicates a second value of the configuration parameter, the second value corresponding to a second set of communication occasions associated with a multiple user MIMO operation; and communicating, based at least in part on the parameter switch configuration, with at least one wireless communication device.

Aspect 2: The method of Aspect 1, wherein the first set of communication occasions comprises at least one of a set of semi-persistent scheduling occasions or a set of configured grant occasions.

Aspect 3: The method of either of Aspects 1 or 2, wherein the parameter switch configuration indicates at least one parameter switching pattern associated with the first value of the configuration parameter and the second value of the configuration parameter.

Aspect 4: The method of any of Aspects 1-3, wherein the first value of the configuration parameter comprises a first beam configuration that indicates a beam selection based at least in part on a signal quality corresponding to the first set of communication occasions.

Aspect 5: The method of any of Aspects 1-4, wherein the second value of the configuration parameter comprises a beam pair configuration that indicates a first beam, and wherein the first beam is paired with a second beam corresponding to an additional UE.

Aspect 6: The method of Aspect 5, wherein the first beam comprises a first uplink beam and wherein the second beam comprises a second uplink beam.

Aspect 7: The method of Aspect 5, wherein the first beam comprises a first downlink beam and wherein the second beam comprises a second downlink beam.

Aspect 8: The method of any of Aspects 1-7, wherein the first parameter configuration is based at least in part on at least one signal quality measurement corresponding to the first set of communication occasions.

Aspect 9: The method of any of Aspects 1-8, wherein the second parameter configuration comprises a parameter pair configuration that indicates a first paired parameter value, and wherein the first paired parameter value is paired with a second paired parameter value corresponding to an additional UE.

Aspect 10: The method of any of Aspects 1-9, wherein the configuration parameter comprises a transmission parameter.

Aspect 11: The method of Aspect 10, wherein the transmission parameter indicates at least one of: a downlink modulation and coding scheme (MCS), an uplink MCS, a downlink precoder, an uplink precoder, a downlink rank indicator, an uplink rank indicator, a downlink transmission power, or an uplink transmission power.

Aspect 12: The method of any of Aspects 1-11, wherein receiving the parameter switch configuration comprises receiving at least one configuration communication that indicates the parameter switch configuration, the at least one configuration communication comprising at least one of a radio resource control message or a downlink control information transmission.

Aspect 13: A method of wireless communication performed by a base station, comprising: transmitting, to a user equipment (UE), a parameter switch configuration comprising: a first parameter configuration that indicates a first value of a configuration parameter, the first value corresponding to a first set of communication occasions associated with a single user multiple input multiple output (MIMO) operation; and a second parameter configuration that indicates a second value of the configuration parameter, the second value corresponding to a second set of communication occasions associated with a multiple user MIMO operation; and communicating, based at least in part on the parameter switch configuration, with the UE.

Aspect 14: The method of Aspect 13, wherein the first set of communication occasions comprises at least one of a set of semi-persistent scheduling occasions or a set of configured grant occasions.

Aspect 15: The method of either of Aspects 13 or 14, wherein the parameter switch configuration indicates at least one parameter switching pattern associated with the first value of the configuration parameter and the second value of the configuration parameter.

Aspect 16: The method of any of Aspects 13-15, wherein the first value of the configuration parameter comprises a first beam configuration that indicates a beam selection based at least in part on a signal quality corresponding to the first set of communication occasions.

Aspect 17: The method of any of Aspects 13-16, wherein the second value of the configuration parameter comprises a beam pair configuration that indicates a first beam, and wherein the first beam is paired with a second beam corresponding to an additional UE.

Aspect 18: The method of Aspect 17, further comprising transmitting, to the additional UE, an additional parameter switch configuration that indicates the second beam.

Aspect 19: The method of either of Aspects 17 or 18, wherein the first beam comprises a first uplink beam and wherein the second beam comprises a second uplink beam.

Aspect 20: The method of either of Aspects 17 or 18, wherein the first beam comprises a first downlink beam and wherein the second beam comprises a second downlink beam.

Aspect 21: The method of any of Aspects 13-20, wherein the first parameter configuration is based at least in part on at least one signal quality measurement corresponding to the first set of communication occasions.

Aspect 22: The method of any of Aspects 13-21, wherein the second parameter configuration comprises a parameter pair configuration that indicates a first paired parameter value, and wherein the first paired parameter value is paired with a second paired parameter value corresponding to an additional UE.

Aspect 23: The method of Aspect 22, further comprising transmitting, to the additional UE, an additional parameter switch configuration that indicates the second paired parameter value.

Aspect 24: The method of any of Aspects 13-23, wherein the configuration parameter comprises a transmission parameter.

Aspect 25: The method of Aspect 24, wherein the transmission parameter indicates at least one of: a downlink modulation and coding scheme (MCS), an uplink MCS, a downlink precoder, an uplink precoder, a downlink rank indicator, an uplink rank indicator, a downlink transmission power, or an uplink transmission power.

Aspect 26: The method of any of Aspects 13-25, wherein transmitting the parameter switch configuration comprises transmitting at least one configuration communication that indicates the parameter switch configuration, the at least one configuration communication comprising at least one of a radio resource control message or a downlink control information transmission.

Aspect 27: An apparatus for wireless communication at a device, comprising a processor; memory coupled with the processor; and instructions stored in the memory and executable by the processor to cause the apparatus to perform the method of one or more of Aspects 1-12.

Aspect 28: A device for wireless communication, comprising a memory and one or more processors coupled to the memory, the one or more processors configured to perform the method of one or more of Aspects 1-12.

Aspect 29: An apparatus for wireless communication, comprising at least one means for performing the method of one or more of Aspects 1-12.

Aspect 30: A non-transitory computer-readable medium storing code for wireless communication, the code comprising instructions executable by a processor to perform the method of one or more of Aspects 1-12.

Aspect 31: A non-transitory computer-readable medium storing a set of instructions for wireless communication, the set of instructions comprising one or more instructions that, when executed by one or more processors of a device, cause the device to perform the method of one or more of Aspects 1-12.

Aspect 32: An apparatus for wireless communication at a device, comprising a processor; memory coupled with the processor; and instructions stored in the memory and executable by the processor to cause the apparatus to perform the method of one or more of Aspects 13-26.

Aspect 33: A device for wireless communication, comprising a memory and one or more processors coupled to the memory, the one or more processors configured to perform the method of one or more of Aspects 13-26.

Aspect 34: An apparatus for wireless communication, comprising at least one means for performing the method of one or more of Aspects 13-26.

Aspect 35: A non-transitory computer-readable medium storing code for wireless communication, the code comprising instructions executable by a processor to perform the method of one or more of Aspects 13-26.

Aspect 36: A non-transitory computer-readable medium storing a set of instructions for wireless communication, the set of instructions comprising one or more instructions that, when executed by one or more processors of a device, cause the device to perform the method of one or more of Aspects 13-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors, coupled to the memory, configured to:
   receive a parameter switch configuration comprising:
   a first parameter configuration that indicates a first value of a configuration parameter, the first value corresponding to a first set of communication occasions associated with a single user multiple input multiple output (MIMO) operation; and
   a second parameter configuration that indicates a second value of the configuration parameter, the second value corresponding to a second set of communication occasions associated with a multiple user MIMO operation, the second value being based at least in part on communications associated with an additional UE in the second set of communication occasions; and
   communicate, based at least in part on the parameter switch configuration, with at least one wireless communication device.

2. The UE of claim 1, wherein the first set of communication occasions comprises at least one of a set of semi-persistent scheduling occasions or a set of configured grant occasions.

3. The UE of claim 1, wherein the parameter switch configuration indicates at least one parameter switching pattern associated with the first value of the configuration parameter and the second value of the configuration parameter.

4. The UE of claim 1, wherein the first value of the configuration parameter comprises a first beam configuration that indicates a beam selection based at least in part on a signal quality corresponding to the first set of communication occasions.

5. The UE of claim 1, wherein the second value of the configuration parameter comprises a beam pair configuration that indicates a first beam, and wherein the first beam is paired with a second beam corresponding to the additional UE.

6. The UE of claim 5, wherein the first beam comprises a first uplink beam and wherein the second beam comprises a second uplink beam.

7. The UE of claim 5, wherein the first beam comprises a first downlink beam and wherein the second beam comprises a second downlink beam.

8. The UE of claim 1, wherein the first parameter configuration is based at least in part on at least one signal quality measurement corresponding to the first set of communication occasions.

9. The UE of claim 1, wherein the second parameter configuration comprises a parameter pair configuration that indicates a first paired parameter value, and wherein the first paired parameter value is paired with a second paired parameter value corresponding to the additional UE.

10. The UE of claim 1, wherein the configuration parameter comprises a transmission parameter.

11. The UE of claim 10, wherein the transmission parameter indicates at least one of:
    a downlink modulation and coding scheme (MCS),
    an uplink MCS,
    a downlink precoder,
    an uplink precoder,
    a downlink rank indicator,
    an uplink rank indicator,
    a downlink transmission power, or
    an uplink transmission power.

12. The UE of claim 1, wherein the one or more processors, to receive the parameter switch configuration, are configured to receive at least one configuration communication that indicates the parameter switch configuration, the at least one configuration communication comprising at least one of a radio resource control message or a downlink control information transmission.

13. A base station for wireless communication, comprising:
    memory; and
    one or more processors, coupled to the memory, configured to:
    transmit, to a user equipment (UE), a parameter switch configuration comprising:
    a first parameter configuration that indicates a first value of a configuration parameter, the first value corresponding to a first set of communication occasions associated with a single user multiple input multiple output (MIMO) operation; and
    a second parameter configuration that indicates a second value of the configuration parameter, the second value corresponding to a second set of communication occasions associated with a multiple user MIMO operation, the second value being based at least in part on communications associated with an additional UE in the second set of communication occasions; and communicate, based at least in part on the parameter switch configuration, with the UE.

14. The base station of claim 13, wherein the first set of communication occasions comprises at least one of a set of semi-persistent scheduling occasions or a set of configured grant occasions.

15. The base station of claim 13, wherein the parameter switch configuration indicates at least one parameter switching pattern associated with the first value of the configuration parameter and the second value of the configuration parameter.

16. The base station of claim 13, wherein the first value of the configuration parameter comprises a first beam configuration that indicates a beam selection based at least in part on a signal quality corresponding to the first set of communication occasions.

17. The base station of claim 13, wherein the second value of the configuration parameter comprises a beam pair configuration that indicates a first beam, and wherein the first beam is paired with a second beam corresponding to the additional UE.

18. The base station of claim 17, wherein the one or more processors are further configured to transmit, to the additional UE, an additional parameter switch configuration that indicates the second beam.

19. The base station of claim 17, wherein the first beam comprises a first uplink beam and wherein the second beam comprises a second uplink beam.

20. The base station of claim 17, wherein the first beam comprises a first downlink beam and wherein the second beam comprises a second downlink beam.

21. The base station of claim 13, wherein the first parameter configuration is based at least in part on at least one signal quality measurement corresponding to the first set of communication occasions.

22. The base station of claim 13, wherein the second parameter configuration comprises a parameter pair configuration that indicates a first paired parameter value, and wherein the first paired parameter value is paired with a second paired parameter value corresponding to the additional UE.

23. The base station of claim 22, wherein the one or more processors are further configured to transmit, to the additional UE, an additional parameter switch configuration that indicates the second paired parameter value.

24. The base station of claim 13, wherein the configuration parameter comprises a transmission parameter.

25. The base station of claim 24, wherein the transmission parameter indicates at least one of:
a downlink modulation and coding scheme (MCS),
an uplink MCS,
a downlink precoder,
an uplink precoder,
a downlink rank indicator,
an uplink rank indicator,
a downlink transmission power, or
an uplink transmission power.

26. The base station of claim 13, wherein the one or more processors, to transmit the parameter switch configuration, are configured to transmit at least one configuration communication that indicates the parameter switch configuration, the at least one configuration communication comprising at least one of a radio resource control message or a downlink control information transmission.

27. A method of wireless communication performed by a user equipment (UE), comprising:
receiving a parameter switch configuration comprising:
a first parameter configuration that indicates a first value of a configuration parameter, the first value corresponding to a first set of communication occasions associated with a single user multiple input multiple output (MIMO) operation; and
a second parameter configuration that indicates a second value of the configuration parameter, the second value corresponding to a second set of communication occasions associated with a multiple user MIMO operation, the second value being based at least in part on communications associated with an additional UE in the second set of communication occasions; and
communicating, based at least in part on the parameter switch configuration, with at least one wireless communication device.

28. The method of claim 27, wherein the first set of communication occasions comprises at least one of a set of semi-persistent scheduling occasions or a set of configured grant occasions.

29. A method of wireless communication performed by a base station, comprising:
transmitting, to a user equipment (UE), a parameter switch configuration comprising:
a first parameter configuration that indicates a first value of a configuration parameter, the first value corresponding to a first set of communication occasions associated with a single user multiple input multiple output (MIMO) operation; and
a second parameter configuration that indicates a second value of the configuration parameter, the second value corresponding to a second set of communication occasions associated with a multiple user MIMO operation, the second value being based at least in part on communications associated with an additional UE in the second set of communication occasions; and
communicating, based at least in part on the parameter switch configuration, with the UE.

30. The method of claim 29, wherein the first set of communication occasions comprises at least one of a set of semi-persistent scheduling occasions or a set of configured grant occasions.

* * * * *